Patented May 27, 1952

2,598,435

UNITED STATES PATENT OFFICE 2,598,435

PROCESS FOR TREATING ORGANO-POLYSILANES

Donald Mohler, Schenectady, and Jesse E. Sellers, Scotia, N. Y., assignors to General Electric Company, a corporation of New York No Drawing. Application August 18, 1949, Serial No. 111,102

5 Claims. (Cl. 260—448.2)

This invention relates to the treatment of organohalogenopolysilanes and to the preparation of organic compounds of silicon particularly organohalogenomonosilanes. More particularly, the invention is concerned with a method which comprises heating an organohalogenopolysilane containing a silicon-silicon linkage at an elevated temperature so as to rupture the silicon-to-silicon bond, thereby to obtain a material of lower molecular weight.

As used herein, the term "organohalogenopolysilane," for instance, an organohalogenodisilane, is intended to mean organic compounds containing the unit structure

where Z is an organic radical, and at least one of the silicon atoms in the polysilane chain contains a silicon-bonded halogen atom, e. g., chlorine, bromine, fluorine, etc., the other valences of the silicon atoms being satisfied by a member selected from the class consisting of hydrogen, an organic radical, halogen, and another silicon atom. Polysilicon compounds containing a plurality of (i. e., at least two) of adjacent silicon atoms as, for instance, those described and claimed in Burkhard application, Serial No. 47,342, filed September 1, 1948, now U. S. Patent No. 2,554,976, and assigned to the same assignee as the present invention, are also included.

The primary object of this invention is to provide a method for degrading organohalogenopolysilanes to organohalogenomonosilanes.

Another object of the invention is to produce alkylhalogenomonosilanes.

A further object of the invention is to produce dimethyldichlorosilane.

A still further object of the invention is to prepare methyltrichlorosilane.

Further objects of this invention will become more apparent as the description thereof proceeds.

In accordance with our invention, we have discovered that if an organohalogenopolysilane of the type described previously is heated at a suitable elevated temperature, rupture of the silicon-to-silicon bond can be effected so as to obtain an organosilicon compound whose molecular weight is lower than that of the starting organohalogenopolysilane. Our invention is particularly applicable to the treatment of individual organodisilanes or high boiling fractions comprising a mixture of organodisilanes corresponding to the general formula $Si_2X_n(R)_{6-n}$ where R is a monovalent hydrocarbon radical (for instance, an alkyl, aryl, alkaryl, aralkyl, etc., radical), X is a halogen (for instance, chlorine, bromine, fluorine, etc.), and $n$ is an integer equal to from 1 to 5, inclusive. Such disilane compositions of matter are obtained usually during the passage of a hydrocarbon halide over heated silicon, preferably in the presence of a catalyst, in accordance with the disclosures and teachings in Rochow Patent U. S. 2,380,995, issued August 7, 1945, and assigned to the same assignee as the present invention. In addition to the usual organohalogenosilanes obtained, mixtures of organohalogenodisilanes corresponding to the above formula are also obtained. These high boiling organohalogenopolysilanes have been found to be useful as a primer coating for treating various surfaces to reduce their adhesion to ice as is more particularly disclosed and claimed in the copending application of Robert Smith-Johannsen, Serial No. 56,673, filed October 26, 1948, now U. S. Patent 2,575,141, and assigned to the same assignee as the present invention.

When methyl chloride is passed over heated silicon in the presence of, e. g., copper catalyst, in a manner disclosed in the aforementioned Rochow patent, there is usually obtained a fraction comprised essentially of a mixture of compounds embraced by the aforementioned formula $Si_2X_n(R)_{6-n}$ where R is a methyl group. This mixture of compounds comprises a high boiling residue (the bulk of this residue boiling from about 125° to 175° C.) and comprises for the most part large amounts of dimethyltetrachlorodisilane (including its various isomers such as, for instance, 1,1-dimethyl-1,2,2,2-tetrachlorodisilane and 1,2-dimethyl-1,1,2,2-tetrachlorodisilane) and trimethyltrichlorodisilane (including its various isomers), as well as small amounts of methylpentachlorodisilane and tetramethyldichlorodisilane (including its isomers). Because all the foregoing organohalogenodisilanes have found only limited use, attempts have been made to treat these materials in some way so as to produce products having a greater utility.

In accordance with our claimed method, we have unexpectedly found that if any of the foregoing organohalogenopolysilanes, particularly the methylchlorodisilanes, are heated at an elevated temperature, we are able to isolate individual organohalogenosilanes free of silicon-to-silicon linkages. These so-called "monomeric" organohalogenosilanes can again be employed for making organopolysiloxanes (i. e., silicone resins, rubbers, oils, etc.) by the usual methods employed for producing such compositions of matter.

That such organohalogenopolysilanes could be degraded to lower molecular weight materials was unexpected and in no way could have been predicted since it was found that attachment of organic groups to a silicon of a disilane, for instance, hexamethyldisilane, rendered such a compound thermally stable at temperatures as high as 500° C. under pressure. It was surprising to find that this stability decreased markedly if there were both a silicon-bonded hydrocarbon radical and a silicon-bonded halogen atom in the disilane.

The reaction is advantageously conducted in the vapor phase at elevated temperatures sufficiently high to effect rupturing of the Si—Si bond but below the decomposition point of the formed monosilanes. Good results are obtained when temperatures of the order of from about 250° to 800° C. are employed. When methylhalogenodisilanes are employed in our process, it is preferred to conduct the reaction at a temperature of from 350° to 600° C.

One method for effecting the reaction comprises passing the organohalogenopolysilane through a heated tube maintained at the required temperature in order to induce cracking of the organohalogenopolysilane to the lower molecular weight materials. It will, of course, be apparent to those skilled in the art that the heated zone through which the polysilane is passed may be packed with various materials usually employed in cracking processes and that such materials may have interspersed therein catalysts capable of accelerating the cracking process. Generally, satisfactory results are obtained when the vapors of the organopolysilane are merely passed through a heated zone maintained at a temperature of from about 250° to 800° C.

In order that those skilled in the art may better understand how the present invention may be practiced, the following example is given by way of illustration and not by way of limitation.

*Example 1*

A mixture comprising methylchlorodisilanes (heated to the vapor state) described previously and obtained as a high-boiling residue (the bulk boiling above 125° C.) from the reaction between methyl chloride and heated silicon in the presence of copper as a catalyst, was passed through a steel tube fifty-four inches long and two and one-half inches wide and heated at around 525° C. at atmospheric pressure. Of approximately 410 parts of products obtained as a result of the passage of the mixture of methylchlorodisilanes, the following lower molecular weight materials were derived:

Composition:

| | Per cent by weight |
|---|---|
| Below 66° C. (includes 3.8% methyldichlorosilane and 3.2% trimethylchlorosilane) | 10.2 |
| Methyltrichlorosilane | 25.8 |
| Dimethyldichlorosilane | 23.0 |
| Residue (the bulk of this distilled between 120° and 140° C.) | 37.9 |
| Loss in handling | 3.1 |

In addition to the halogenodisilanes employed above, we may also use other halogenodisilanes corresponding to the above-identified general formula $Si_2X_n(R)_{6-n}$ where R is any monovalent organic radical, for example, an alkyl radical (for instance, ethyl, propyl, butyl, isobutyl, amyl, decyl, etc.), aryl radical (for instance, phenyl, naphthyl, anthracyl, etc.), alkaryl radical (for instance, tolyl, xylyl, ethylphenyl, etc.), aralkyl radical (for instance, benzyl, phenylethyl, etc.), other saturated and unsaturated aliphatic and cycloaliphatic radicals, for instance, vinyl, allyl, butadienyl, propinyl, cyclohexanyl, cyclohexenyl, cyclopentanyl, etc., radicals and $n$ has the meaning given above. The organic radicals mentioned above which are present in the organohalogenodisilane may have attached to them other modifying groups, for example, halogens, nitril radicals, etc., which are essentially inert at the elevated temperatures at which the claimed invention is conducted.

It will also be understood by those skilled in the art that the temperatures employed in practicing our invention may be varied within the limits mentioned previously and that pressures other than atmospheric, for example, superatmospheric and subatmospheric pressures, may also be employed without departing from the scope of the invention. In addition, other organohalogenopolysilanes having more than two (e. g., three to ten or more) adjacent silicon atoms and containing the structural unit

described in the second paragraph of this application where Z is an organic radical having the meaning such as, for instance, that assigned to R, may also be employed without departing from the scope of the claimed invention. Among such compounds may be mentioned dimethylhexachlorotrisilane, tetrachlorotetramethyltrisilane, pentaethylpentachlorotetrasilane, etc.

As pointed out previously, our invention has particular application to high boiling residues obtained by the passage of a hydrocarbon halide over heated silicon. Such high boiling residues which often comprise approximately ten per cent of the total reaction product can be degraded to the lower molecular weight monosilanes, thereby increasing the effective yields of monomeric materials, i. e., organohalogenomonosilanes, obtained by the process described in the aforementioned Rochow Patent 2,380,995.

What we claim as new and desire to secure by Letters Patent of the United States is:

1. The method which comprises heating a composition comprising as the essential ingredient a methylhalogenopolysilane containing a silicon-silicon linkage and a silicon-bonded methyl group at a temperature of at least 250° C. and below the decomposition point of the formed methylhalogenomonosilanes.

2. The process which comprises heating at a temperature of from 250° to 800° C. a mixture of ingredients consisting essentially of a mixture of methylhalogenodisilanes so as to obtain a volatile product containing methylhalogenomonosilanes.

3. The process which comprises heating a mixture of ingredients consisting essentially of a mixture of methylchlorodisilanes at a temperature of from 250° to 800° C. thereby to obtain a volatile product containing methylchloromonosilanes.

4. The process which comprises heating at a temperature of from 350° to 600° C. a composition consisting essentially of a mixture of ingredients corresponding to the general formula $$Si_2X_n(CH_3)_{6-n}$$

where X is a halogen and $n$ is an integer equal from 1 to 5 thereby to obtain a volatile product containing a methylhalogenomonosilane.

5. The process which comprises heating at a temperature of from 350° to 600° C. a composition of matter consisting essentially of a mixture of methylchlorodisilanes corresponding to the general formula $Si_2Cl_n(CH_3)_{6-n}$ where $n$ is an integer equal to from 1 to 5 thereby to obtain a volatile product containing a methylchloromonosilane.

DONALD MOHLER.
JESSE E. SELLERS.

REFERENCES CITED

The following references are of record in the file of this patent:

Palmer et al.: Jour. Chem. Soc. (London), vol. 133 (1930), p. 1020–28.

Rochow: Chemistry of the Silicones (1946), pp. 5 and 46, Wiley and Sons, publishers.